(12) United States Patent
Tanouchi et al.

(10) Patent No.: US 11,451,104 B2
(45) Date of Patent: Sep. 20, 2022

(54) MOTOR DRIVE APPARATUS HAVING ELECTRIC POWER FLOWING INTO/OUT OF POWER DEVICE THROUGH BUS BAR

(71) Applicant: Fanuc Corporation, Yamanashi (JP)

(72) Inventors: Hironao Tanouchi, Yamanashi (JP); Jianzhou Chen, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 217 days.

(21) Appl. No.: 16/991,390

(22) Filed: Aug. 12, 2020

(65) Prior Publication Data
US 2021/0066985 A1    Mar. 4, 2021

(30) Foreign Application Priority Data

Sep. 3, 2019    (JP) .............................. JP2019-160392

(51) Int. Cl.
*H02K 3/50*    (2006.01)
*H02K 11/33*    (2016.01)

(52) U.S. Cl.
CPC .............. *H02K 3/50* (2013.01); *H02K 11/33* (2016.01); *H02K 2203/09* (2013.01); *H02K 2211/03* (2013.01)

(58) Field of Classification Search
CPC .. H02K 2203/09; H02K 2211/03; H02K 3/50; H02K 11/33
See application file for complete search history.

(56) References Cited

U.S. PATENT DOCUMENTS

| 5,747,897 | A  | * | 5/1998 | Iwasa ..................... H02K 37/14 310/194 |
| 9,627,947 | B2 | * | 4/2017 | Sugiura .................. H02K 11/33 |
| 10,605,248 | B2 | * | 3/2020 | Wagner .................... H02K 3/50 |
| 2021/0066985 | A1 | * | 3/2021 | Tanouchi ................ H02K 11/33 |
| 2021/0194231 | A1 | * | 6/2021 | Tanouchi ................. H01R 4/34 |
| 2022/0025904 | A1 | * | 1/2022 | Unterberger ............ F04D 13/06 |
| 2022/0037967 | A1 | * | 2/2022 | Yamaguchi .............. H02K 5/16 |

FOREIGN PATENT DOCUMENTS

| JP | 06302932 A | 10/1994 |
| JP | 07029874 U | 6/1995 |
| JP | 2011234488 A | 11/2011 |

* cited by examiner

*Primary Examiner* — Robert W Horn
(74) *Attorney, Agent, or Firm* — RatnerPrestia

(57) ABSTRACT

A motor drive apparatus includes: a power device constituting a portion of a power conversion circuit for generating electric power for driving a motor and having input/output terminals; a printed wiring board having a hole; a bus bar connected to both of the power device and the printed wiring board, wherein the bus bar includes a first plate-like connector portion to be fixed to the input/output terminal, a second connector portion to be connected to the printed wiring board, and an extension portion extending between the first connector portion and the second connector portion that will pass through the hole.

10 Claims, 9 Drawing Sheets

MOTOR DRIVE APPARATUS HAVING ELECTRIC POWER FLOWING INTO/OUT OF POWER DEVICE THROUGH BUS BAR

CROSS-REFERENCE TO RELATED APPLICATIONS

This application is a new U.S. Patent Application that claims benefit of Japanese Patent Application No. 2019-160392, dated Sep. 3, 2019, the disclosure of which is incorporated herein by reference in its entirety for all purposes.

BACKGROUND OF THE INVENTION

1. Field of the Invention

The present invention relates to a motor drive apparatus in which electric power flows into/out of a power device through a bus bar.

2. Description of the Related Art

In a motor drive apparatus for driving a motor in machine tools, forging machinery, injection molding machines, industrial machinery, or various types of robots, electric power supplied from an AC power supply or a DC power supply is converted by a power conversion circuit into electric power for driving the motor (motor driving power). Examples of power conversion circuits include an inverter that converts input DC power into AC power to output the AC power and a rectifier (also referred to as a "converter") that converts input AC power into DC power to output the DC power. For example, AC power supplied from an AC power supply is converted temporarily into DC power; subsequently, the DC power is further converted into AC power by an inverter, and the AC power is supplied as motor driving power.

Power conversion circuits including an inverter and a PWM rectifier consist of, for example, a bridge circuit containing high-power semiconductor switching devices, which are referred to as power devices, and diodes connected in anti-parallel to the power devices, and performs power conversion in response to on/off driving of the power devices. As relatively high current flows through the power device, a bus bar is employed for an electrical connection with an electrode terminal of the power device. The bus bar is made of metal such as copper, brass, or aluminum, and produced, for example, by a sheet-metal process. In power conversion circuits, various electric circuits are provided, such as a main circuit consisting of a bridge circuit containing power devices, a control circuit for controlling power conversion, a detector circuit for detecting current or voltage used in various types of processes such as power conversion or abnormality detection, and a snubber circuit for protecting circuits from a surge voltage that occurs when switching the power devices on/off. These electric circuits consist of various components such as a resistor, a capacitor, an inductor, a diode, a FET (field effect transistor), an operational amplifier, a photocoupler, an analog-to-digital conversion circuit (ADC), a digital-to-analog conversion circuit (DAC), or various types of integrated circuits. These components are often mounted in groups on a printed wiring board in order to reduce the dimension of and simplify circuit traces. In the motor drive apparatus, the printed wiring board on which various components are mounted is disposed close to the power device, and electrically and physically connected to the power device. For example, a detector circuit for detecting a current flowing into/out of a power device through a bus bar or detecting an electric potential of the bus bar connected to the power device is provided on a surface of the printed wiring board. In this case, the bus bar is not only electrically connected to an input/output terminal of the power device, but also electrically connected to electrical traces leading to the detector circuit in the printed wiring board.

For example, as disclosed in Japanese Unexamined Patent Publication No. H06-302932, there is known a printed wiring board, including: an electrode terminal having a hole for inserting a screw or the like at a predetermined position and claws for soldering the electrode terminal onto the printed circuit, the electrode terminal made of a good-conducting metal plate and formed by a bending process; and a printed wiring board having a mounting hole, the mounting hole suitable for inserting the claws of the electrode terminal and having wirings for components mounted on the printed wiring board, and a punched hole at a position immediately below the hole for inserting a screw or the like when inserting the claws of the electrode terminal into the mounting hole, wherein by inserting the claws into the mounting hole of the printed wiring board and soldering the claws, the electrode terminal is fixed to the printed wiring board.

For example, as disclosed in Japanese Unexamined Patent Publication No 2011-234488, there is known a power conversion device (1), including: a plurality of semiconductor modules (16A, 16B) constituting a portion of a power conversion circuit; a control circuit unit (25) electrically connected to the semiconductor modules (16A, 16B) for controlling the semiconductor modules (16A, 16B); a bus bar (23) electrically connected to the semiconductor modules (16A, 16B) for causing the semiconductor modules (16A, 16B) to input and output electric power; a terminal block (24) on which the bus bar (23) and a high-voltage cable (30) for inputting/outputting electric power from/to the outside and to which the bus bar (23) and the high-voltage cable (30) are connected; and a housing (26) for accommodating the semiconductor modules (16A, 16B), the bus bar (23), and the terminal block (24), wherein the housing (26) includes: a first insertion hole (29) and a second insertion hole (38), into which the high-voltage cable (30) can be inserted; a work hole (35) formed opposed to the terminal block (24) for coupling the high-voltage cable (30) to the terminal block (24); an insertion hole lid (39) for closing one of the first insertion hole (29) and the second insertion hole (38), into which the high-voltage cable (30) is not inserted; and a work hole lid (36) for closing the work hole, wherein the first insertion hole (29) and the second insertion hole (38) are formed facing against each other across the terminal block (24), and wherein the work hole (35) is formed in a direction perpendicular to the direction connecting the first insertion hole (29) and the second insertion hole (38).

For example, as disclosed in Japanese Unexamined Utility Model Publication No. H07-29874 titled "High-current printed wiring board", there is known a coupling structure for a high-current printed wiring board, characterized in that a terminal block penetrating from one side to the other side through a high-current printed wiring board and projecting from both sides of the high-current printed wiring board is fixed to the high-current printed wiring board and a conductor or a high-current component abutting against the terminal block on a first side of the terminal block is fastened and fixed to the terminal block by a screw inserted into a hole of the terminal block from a second side of the terminal block to the first side.

SUMMARY OF INVENTION

As described above, in a motor drive apparatus where a printed wiring board is disposed close to a power device to which a bus bar is electrically and physically connected, the bus bar is also electrically connected to electrical traces formed in the printed wiring board.

For example, it is possible to electrically and physically fix the bus bar to the power device and the printed wiring board by placing the printed wiring board between the bus bar and an input/output terminal of the power device and fastening the bus bar to the input/output terminal of the power device with a screw. In this case, while fastening power of screw tightening between the bus bar and the power device may be secured by forming a threaded hole on the bus bar by a burring process, an end face of the portion of the bus bar formed by the burring process comes into contact with the input/output terminal of the power device; therefore, a contact surface is small and heat loss will increase. In addition, processing a member having a narrow width like the bus bar by means of the burring process is difficult, and leads to increase in the production cost of the motor drive apparatus. In contrast, when a threaded hole without burring is formed in the bus bar in order to reduce the production cost, the bus bar is electrically connected to the input/output terminal of the power device via a land formed on the printed wiring board, which leads to low vibration resistance and higher heat loss.

For example, in order to increase vibration resistance, it is also possible to electrically and physically fix the bus bar to the power device and the printed wiring board with placing the printed wiring board between the bus bar and the input/output terminal of the power device by fastening the bus bar to the input/output terminal of the power device by means of screw tightening and fastening the bus bar to the printing wiring board by means of screw tightening. In this case, two threaded holes are formed in the bus bar; as a result, a force is applied to the bus bar during screw tightening and the strength of the bus bar is reduced. In addition, processing a member having a narrow width like the bus bar at two positions by means of the burring process or threaded hole formation is even more difficult, and leads to increase in the production cost of the motor drive apparatus.

Therefore, in the motor drive apparatus, it is desired to realize a structure for coupling the bus bar to the power device and the printed wiring board, which achieves low heat loss, high coupling strength, high vibration resistance, and low cost.

According to one aspect of the present disclosure, a motor drive apparatus includes: a power device constituting a portion of a power conversion circuit for generating motor driving power and having input/output terminals; a printed wiring board having a hole; and a bus bar connected to both of the power device and the printed wiring board, wherein the bus bar includes a first plate-like connector portion to be fixed to an input/output terminal, a second connector portion to be connected to the printed wiring board, and an extension portion extending between the first connector portion and the second connector portion that will pass through the hole.

BRIEF DESCRIPTION OF THE DRAWINGS

The present invention will be more clearly understood with reference to the following accompanying drawings.

DETAILED DESCRIPTION

Figure 1:
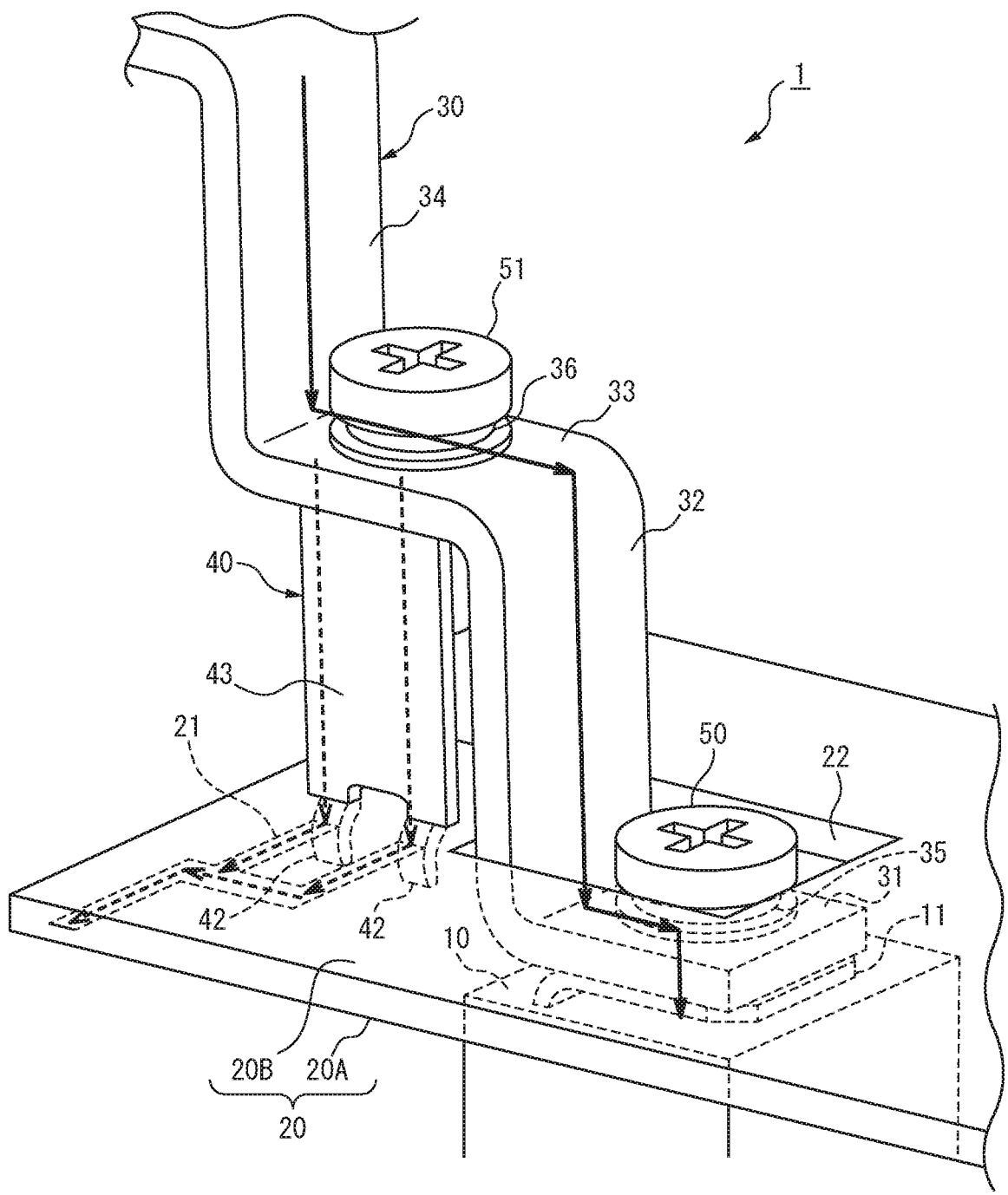
FIG. 1 is a perspective view illustrating a structure for coupling a bus bar to a printed wiring board and a power device in a motor drive apparatus according to one embodiment of the present disclosure.

With reference to drawings, a motor drive apparatus in which electric power flows into/out of a power device through a bus bar will be described below. To facilitate understanding, these drawings use different scales as appropriate. Embodiments illustrated in the drawings are examples for implementing the present disclosure, and the present disclosure is not limited to the illustrated embodiments.

Figure 2:
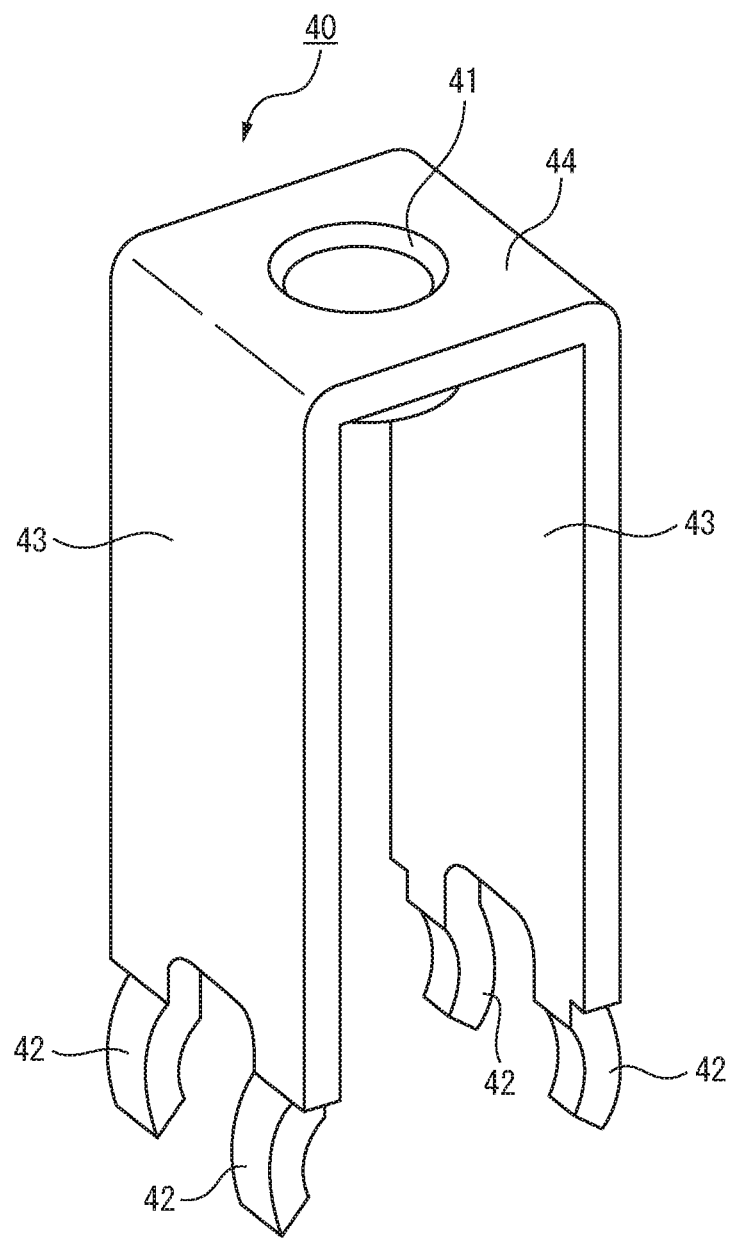
FIG. 2 is a perspective view illustrating a conductive support block in the motor drive apparatus according to one embodiment of the present disclosure.
Figure 3:
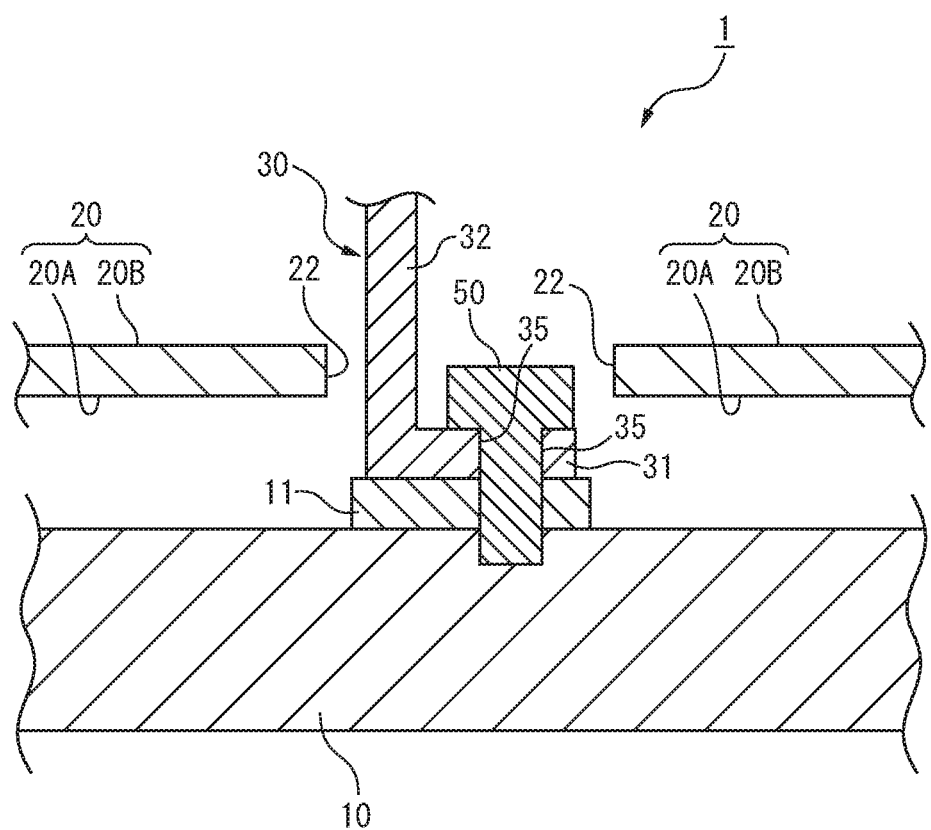
FIG. 3 is a sectional view illustrating a structure for coupling the bus bar to the printed wiring board and the power device in the motor drive apparatus according to one embodiment of the present disclosure.

FIG. 1 is a perspective view illustrating a structure for coupling the bus bar to the printed wiring board and the power device in the motor drive apparatus according to one embodiment of the present disclosure. Hereinafter, the same reference numerals in different drawings denote components having the same functions. FIG. 2 is a perspective view illustrating a conductive support block in the motor drive apparatus according to one embodiment of the present disclosure. FIG. 3 is a sectional view illustrating a structure for coupling the bus bar to the printed wiring board and the power device in the motor drive apparatus according to one embodiment of the present disclosure.

A motor drive apparatus 1 includes a power device 10, a printed wiring board 20, and a bus bar 30. In the motor drive apparatus 1, as a terminal mounted on the printed wiring board 20 for supporting the bus bar 30, a conductive support block 40 is also provided. Examples of machinery provided with a motor driven by the motor drive apparatus 1 include, for example, machine tools, robots, forging machinery, injection molding machines, industrial machinery, various types of electrical appliances, trains, automobiles, and aircraft.

The power device 10 is a semiconductor switching device constituting a portion of a power conversion circuit for generating motor driving power in the motor drive apparatus 1. Examples of the power conversion circuit include an inverter and a PWM rectifier. The power conversion circuit includes, for example, a bridge circuit containing power devices and diodes connected in anti-parallel to the power devices, and performs power conversion in response to on/off driving of the power devices. Examples of the power devices include a unipolar transistor such as a FET, a bipolar transistor, an IGBT, a thyristor, and a GTO although the type of the power device itself does not limit the present embodiment and may be other types of power devices.

The power device 10 has an input terminal to which current flows and an output terminal from which current flows. In the present embodiment, a terminal of the power device 10 to be connected to the bus bar 30 may be the input terminal or the output terminal. Hereinafter, the terminal of the power device 10 to be connected to the bus bar 30 will be referred to as an "input/output terminal 11".

On the printed wiring board 20, various electric circuits are provided, such as a control circuit for controlling power conversion by the power conversion circuit containing the power device 10, a detector circuit for detecting current or voltage used in various types of processes such as power conversion or abnormality detection, and a snubber circuit for protecting circuits from a surge voltage that is generated when switching the power device on/off. These electric circuits consist of various components such as a resistor, a capacitor, an inductor, a diode, a FET (field effect transistor), an operational amplifier, a photocoupler, an analog-to-digital conversion circuit (ADC), a digital-to-analog conversion circuit (DAC), or various types of integrated circuits. These components are mounted on the printed wiring board 20, and these components are appropriately connected to each other by electrical traces in accordance with corresponding functions of electric circuits containing those components. Among the various electric circuits provided on the printed wiring board 20, the detector circuit for detecting a current flowing into/out of the power device 10 through the bus bar 30 or detecting an electric potential of the bus bar 30 connected to the power device 10, and the snubber circuit, in particular, are electrically connected to the bus bar 30. Hereinafter, among the electrical traces formed in the printed wiring board 20, electrical traces on the printed wiring board 20 to be electrically connected to the bus bar 30 will be referred to as "electrical traces 21". The electrical traces 21 may be formed inside the printed wiring board 20 (i.e., embedded inside the printed wiring board 20), formed on a surface 20A, or formed on a second surface 20B of the printed wiring board 20. In the illustrated example, as an example, the electrical traces 21 are formed inside the printed wiring board 20.

In addition, the printed wiring board 20 has a hole 22. The size of the hole 22 will be described later.

The bus bar 30 is connected to both of the power device 10 and the printed wiring board 20. The bus bar 30 is a conductor for conducting relatively large current, made of metal such as copper, brass, or aluminum, and produced, for example, by a sheet-metal process.

The bus bar 30 includes a first plate-like connector portion 31 to be fixed to the input/output terminal 11 of the power device 10, a second connector portion 33 to be connected to the printed wiring board 20, and an extension portion 32 extending between the first connector portion 31 and the second connector portion 33 that will pass through the hole 22 of the printed wiring board 20. The first connector portion 31 is disposed on a side of the first surface 20A of the printed wiring board 20 while the second connector portion 33 is disposed on a side of the second surface 20B of the printed wiring board 20. In other words, the first connector portion 31 and the second connector portion 33 are disposed across the printed wiring board 20. At an end of the second connector portion 33 opposite to the end where the extension portion 32 is located, a third connector portion 34 extending in a direction opposite to the direction in which the extension portion 32 extends is provided, and a power supply or other power conversion circuits may be electrically connected to a position further away from the third connector portion 34.

The extension portion 32 extends in a direction that intersects with both of the first connector portion 31 and the second connector portion 33, and passes through the hole 22 from the side of the second surface 20B toward the side of the first surface 20A of the printed wiring board 20. In the illustrated example, as an example, the extension portion 32 passes through the hole 22 along a direction of the normal to the second surface 20B of the printed wiring board 20 (i.e., a direction perpendicular to the second surface 20B of the printed wiring board 20). As an alternative example, the extension portion 32 may be located to pass through the hole 22 in such a way that the direction in which the extension portion 32 passes through the hole 22 is at a predetermined inclined angle to the direction of the normal to the second surface 20B of the printed wiring board 20.

The first connector portion 31 and the extension portion 32 are connected via a bend and the extension portion 32 and the second connector portion 33 are connected via a bend; thus, the bus bar 30 has a bent structure. In the illustrated example, as an example, the first connector portion 31 substantially orthogonally intersects with the extension portion 32 and the extension portion 32 substantially orthogonally intersects with the second connector portion 33; thus, the bus bar 30 has a stepped structure, which is one form of the bent structure. Since the bus bar 30 has a stepped structure as described above, and an error in fixing the bus bar 30 to the printed wiring board 20 and the power device 10 may be mitigated, production of the motor drive apparatus 1 is facilitated. The bus bar 30 itself may be easily produced because it is formed by processing a conductive metal plate into a stepped shape by a bending process. In addition, the stepped structure possesses elasticity, which improves strength (fracture resistance) and vibration resistance of the bus bar 30. Note that, although the second connector portion 33 and the third connector portion 34 are also connected via the bend in the illustrated example, as an alternative example, the second connector portion 33 and the third connector portion 34 may be directly connected without the bend.

The bus bar 30 is fastened to the input/output terminal 11 of the power device 10 at the first connector portion 31 by means of screw tightening using a screw 50; thus, the bus bar 30 is electrically and physically connected to the input/output terminal 11 of the power device 10. The screw 50 is preferably made of a conductive material. The first connector portion 31 is plate-like, and this plate-like portion comes into contact with the input/output terminal 11 of the power device 10; therefore, the electrically connected area is large and heat loss may be reduced. Thus, high current may be caused to flow from the bus bar 30 toward the power device 10 or from the power device 10 toward the bus bar 30.

To fix the bus bar 30 to the power device 10, the first connector portion 31 and the extension portion 32 of the bus bar 30 are inserted into the printed wiring board 20 from the side of the second surface 20B to the first surface 20A on which the input/output terminal 11 of the power device 10 is disposed. Subsequently, the screw 50 is inserted into the printed wiring board 20 from the side of the second surface 20B to the first surface 20A on which the input/output terminal 11 of the power device 10 is disposed. Then, the first connector portion 31 is fixed to the input/output terminal 11 of the power device 10 by means of screw tightening using the screw 50.

For this reason, in the first connector portion 31 of the bus bar 30, a hole 35 for inserting a screw is formed for fastening the first connector portion 31 to the input/output terminal 11 of the power device 10 by means of screw tightening. The hole 22 of the printed wiring board 20 at least has a size and a shape that enable the bus bar 30 to be inserted therethrough and the screw 50 to be turned with a tool at a slot formed at the top face of the screw 50. More preferably, the hole 22 of the printed wiring board 20 has a size and a shape that enable the top face of the screw 50 to be visible, when the extension portion 32 of the bus bar 30 is inserted into the hole 22 and the first connector portion 31 of the bus bar 30 is fixed to the input/output terminal 11 of the power device 10 by the screw 50, through the hole 22 from the side of the printed wiring board 20 where the second connector portion 33 is located. Even more preferably, the hole 22 of the printed wiring board 20 has a size and a shape greater than the sum of the area of a cross-section of the extension portion 32 (the cross-section parallel to the second surface 20B of the printed wiring board 20) and the area of a surface of the first plate-like connector portion 31 (the surface parallel to the second surface 20B of the printed wiring board 20). For example, if the hole 22 of the printed wiring board 20 has a size and a shape that enable the first plate-like connector portion 31 to be visible, an operator can perform an operation of inserting the extension portion 32 of the bus bar 30 into the hole 22 and fixing the first connector portion 31 to the input/output terminal 11 of the power device 10 by means of the screw 50 without stress, and maintenance work after the production becomes easier. Note that, while fixing the bus bar 30 to the power device 10 is easier as the hole 22 of the printed wiring board 20 is larger, the area of the printed wiring board 20 in which components may be mounted will be smaller; therefore, the size and the shape of the hole 22 of the printed wiring board 20 are preferably designed in view of balancing ease of fixing the bus bar 30 with footprints of components.

The bus bar 30 is electrically and physically connected to the printed wiring board 20 at the second connector portion 33 via the conductive support block 40. The second connector portion 33 is fixed to the conductive support block 40 by means of screw tightening using a screw 51. For this reason, in the second connector portion 33 of the bus bar 30, a hole 36 for inserting a screw is formed for fastening the second connector portion 33 to the conductive support block 40 by means of screw tightening.

The conductive support block 40 is mounted on the printed wiring board 20 and located between the second connector portion 33 of the bus bar 30 and the printed wiring board 20. The bus bar 30 having a stepped structure possesses higher vibration resistance since it is coupled to the printed wiring board 20 via the conductive support block 40.

The conductive support block 40 includes a top plate 44 to be fixed to the second connector portion 33 of the bus bar 30 and a pair of side plates 43 extending from a pair of edges of the top plate 44 in a direction that intersects with the top plate 44 and disposed at a distance from each other, and supports the second connector portion 33 of the bus bar 30 fixed to the top plate 44 at a position separated from the printed wiring board. More specifically, in the top plate 44, a hole 41 for inserting a screw is formed for fastening the second connector portion 33 of the bus bar 30 to the conductive support block 40 by means of screw tightening. In addition, at distal ends of the side plates 43, terminals 42 for the printed wiring board are provided for electrically connecting the electrical traces 21 of the printed wiring board 20, by soldering, to the conductive support block 40. The terminals 42 for the printed wiring board have, for example, a claw shape possessing elasticity, and by fitting the terminals 42 into the hole formed in the printed wiring board 20, the conductive support block 40 is firmly fixed to the second surface 20B of the printed wiring board 20 and the electrical traces 21 formed inside the printed wiring board 20 is electrically connected to the conductive suppose block 40. The shapes of the terminals 42 for the printed wiring board may be a shape different from the illustrated claw shape. In addition, for example, the terminals 42 for the printed wiring board may be electrically connected to the electrical traces 21 formed inside the printed wiring board 20 via a land formed on the printed wiring board 20.

In this manner, the bus bar 30 is electrically and physically fixed to the input/output terminal 11 of the power device 10 at the first connector portion 31 by means of screw tightening using the screw 50, and electrically and physically fixed to the conductive support block 40 at the second connector portion by means of screw tightening using the screw 51. The conductive support block 40 is electrically and physically fixed to the printed wiring board 20 via the terminals 42 for the printed wiring board. Therefore, the bus bar 30 is electrically connected to the input/output terminal 11 of the power device 10 at the first connector portion 31, and electrically connected to the electrical traces 21 of the printed wiring board 20 at the second connector portion 33 via the conductive support block 40.

When the embodiments of the present disclosure are applied to the coupling structure in the case where current flows from the bus bar 30 into the power device 10, setting an impedance of the conductive support block 40 to be higher than the input impedance of the power device 10 may cause current lower than the current flowing from the bus bar 30 into the power device 10 (the solid arrow in FIG. 1) to flow from the bus bar 30 into the electrical traces 21 of the printed wiring board 20 (the dashed arrow in FIG. 1). Therefore, by appropriately adjusting the impedance of the conductive support block 40, the current flowing through the bus bar 30 may be divided into high current flowing into the power device 10 and low current flowing into the electrical traces 21 of the printed wiring board 20.

When the embodiments of the present disclosure are applied to the coupling structure in the case where current flows out of the power device 10 to the bus bar 30, setting the impedance of the conductive support block 40 to be higher than that of the bus bar 30 may cause current lower than the current flowing out of the power device 10 to the bus bar 30 (not illustrated in FIG. 1) to flow into the electrical traces 21 of the printed wiring board 20 through the bus bar 30 (not illustrated in FIG. 1) and the conductive support block 40. Therefore, by appropriately adjusting the impedance of the conductive support block 40, the current flowing out of the power device 10 may be divided into high current flowing toward the third connector portion 34 of the bus bar 30 and low current flowing into the electrical traces 21 of the printed wiring board 20 through the conductive support block 40.

Figure 4A:
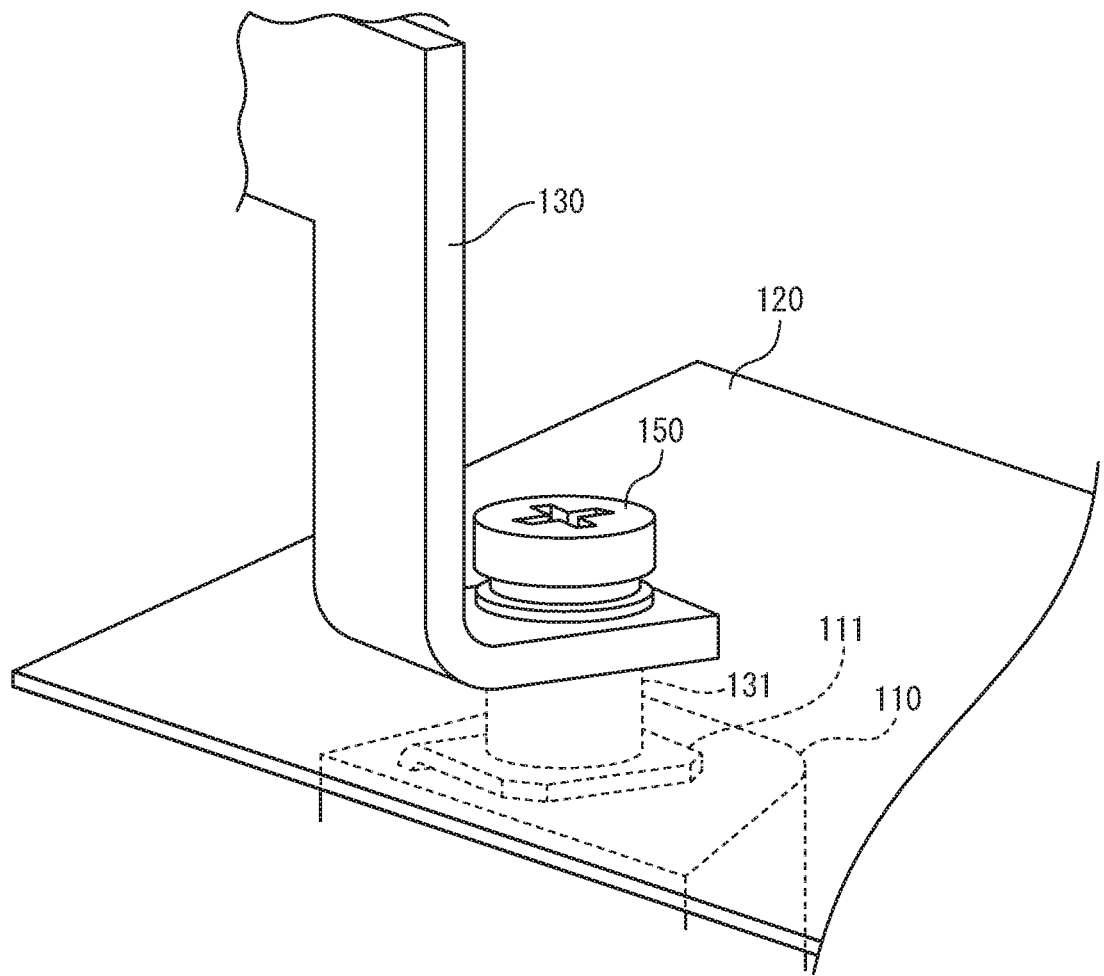
FIG. 4A is a perspective view illustrating a coupling structure according to conventional art, in which coupling is made with placing the printed wiring board between the bus bar (with burring) and the power device.
Figure 4B:
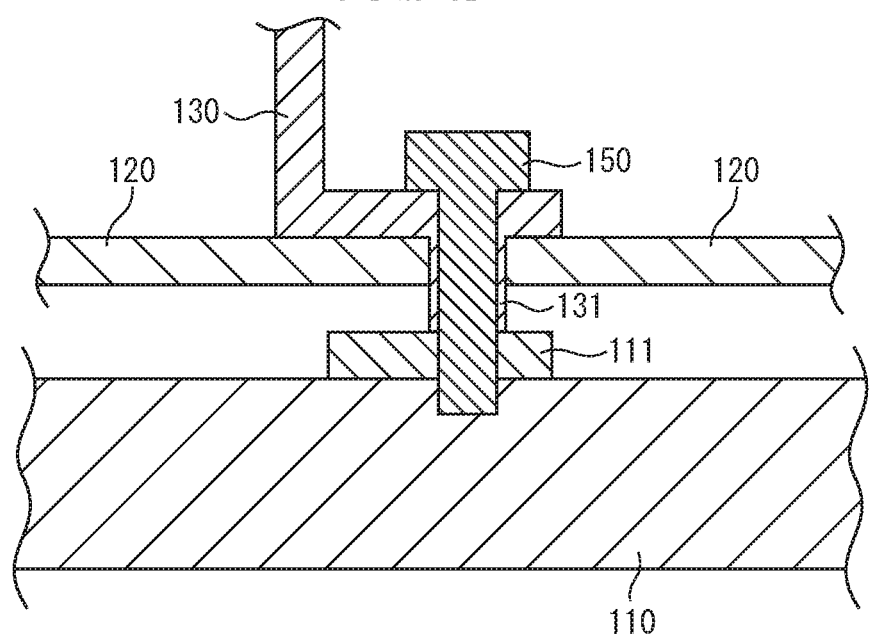
FIG. 4B is a sectional view illustrating the coupling structure according to conventional art, in which coupling is made with placing the printed wiring board between the bus bar (with burring) and the power device.

FIG. 4A is a perspective view illustrating a coupling structure according to conventional art, in which coupling is made with placing the printed wiring board between the bus bar (with burring) and the power device. FIG. 4B is a sectional view illustrating the coupling structure according to conventional art, in which coupling is made with placing the printed wiring board between the bus bar (with burring) and the power device. Note that, in FIG. 4A and FIG. 4B, illustration of electrical traces formed in a printed wiring board 120 electrically connected to a bus bar 130 is omitted.

As illustrated in FIG. 4A and FIG. 4B, a coupling structure has been traditionally employed, in which the bus bar 130 is electrically and physically fixed to a power device 110 and the printed wiring board 120 by placing the printed wiring board 120 between the bus bar 130 in which a threaded hole is formed by a burring process and an input/output terminal 111 of the power device 110 and fastening the bus bar 130 to the input/output terminal 111 of the power device 110 with a screw 150. While fastening power of screw tightening between the bus bar 130 and the power device 110 may be secured by forming, by the burring process, a threaded hole on the bus bar 130 through which the screw 150 passes, an end face of the portion 131 of the bus bar 130 formed by the burring process comes into contact with the input/output terminal 111 of the power device 110; therefore, a contact surface is small and heat loss increases. In addition, processing a member having a narrow width like the bus bar 130 by means of the burring process is difficult, and leads to increase in the production cost of the motor drive apparatus.

Figure 5:
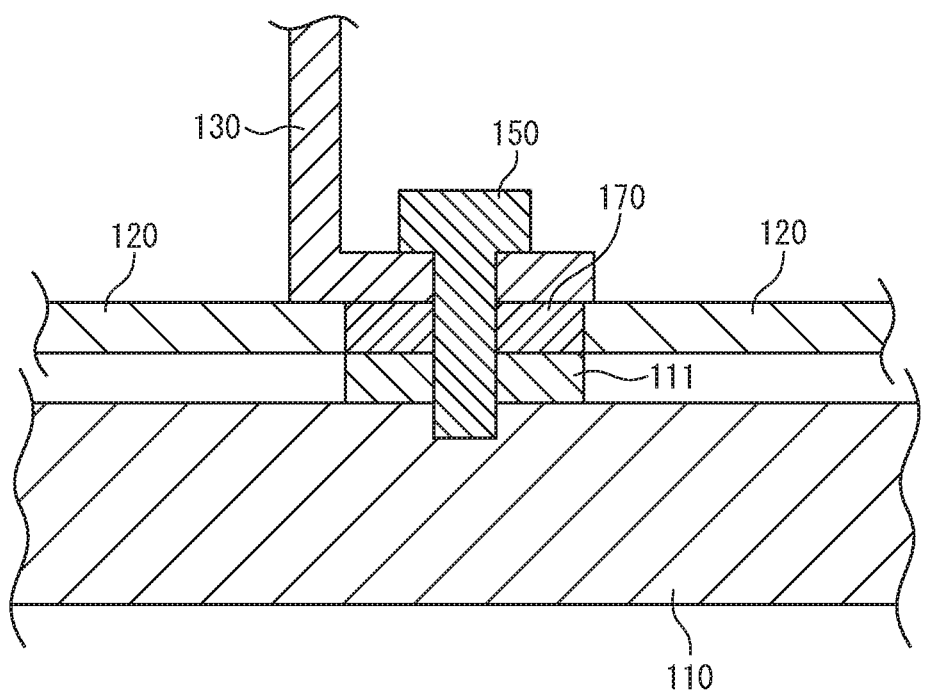
FIG. 5 is a sectional view illustrating a coupling structure according to conventional art, in which coupling is made with placing the printed wiring board between the bus bar (without burring) and the power device.

FIG. 5 is a sectional view illustrating a coupling structure according to conventional art, in which coupling is made with placing the printed wiring board between the bus bar (without burring) and the power device. Note that, in FIG. 5, illustration of electrical traces formed in the printed wiring board 120 electrically connected to the bus bar 130 is omitted.

As illustrated in FIG. 5, in the past, when the bus bar 130 without burring is electrically and physically connected to the power device 110 with placing the printed wiring board 120 between the bus bar 130 and the input/output terminal 111 of the power device 110, the bus bar 130 was electrically connected to the input/output terminal 111 of the power device 110 via a land 170. Consequently, heat loss is higher compared to a case where the bus bar 130 is directly connected to the input/output terminal 111 of the power device 110. In addition, processing a member having a narrow width like the bus bar 130 by means of the burring process is difficult, and leads to increase in the production cost of the motor drive apparatus.

Figure 6A:
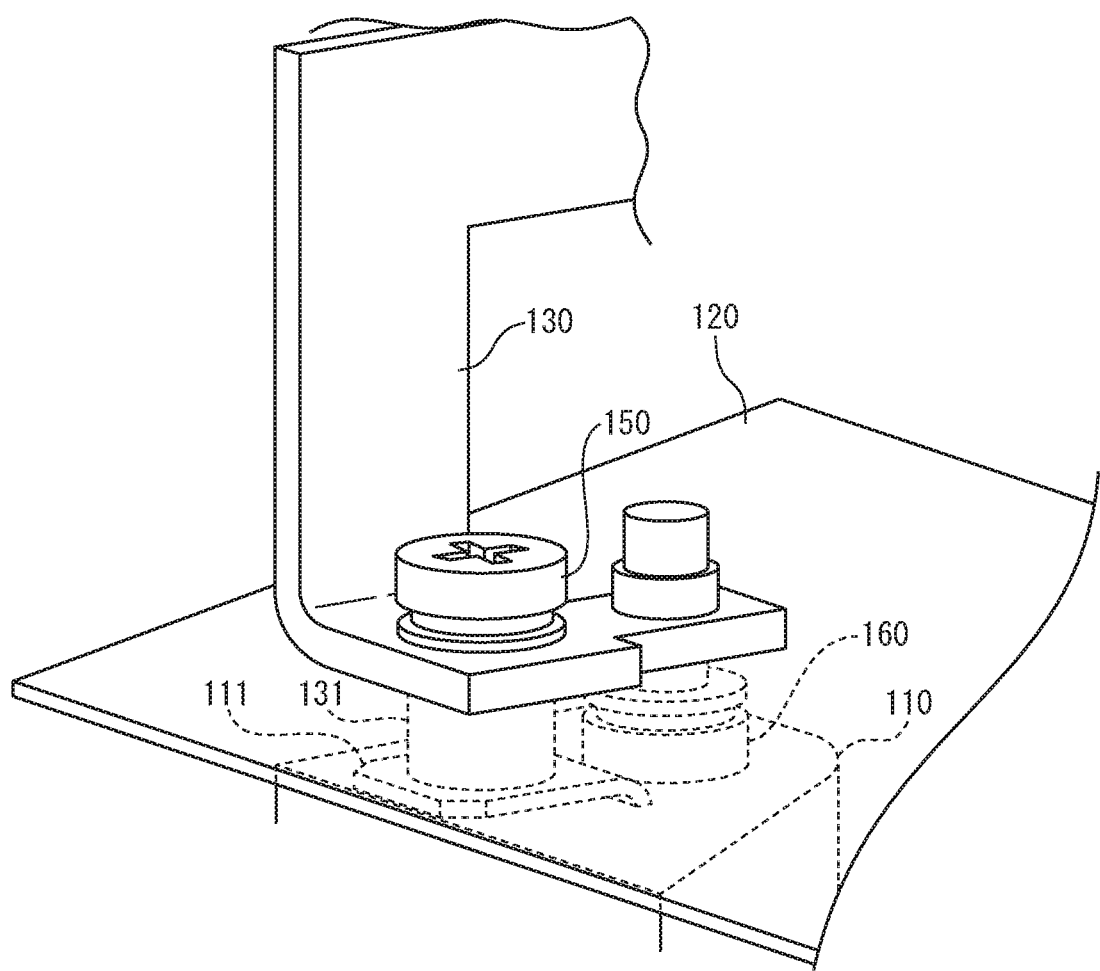
FIG. 6A is a perspective view illustrating a coupling structure according to conventional art, in which fastening by means of screw tightening is employed for both of coupling the bus bar to the power device and coupling the bus bar to the printed wiring board.
Figure 6B:
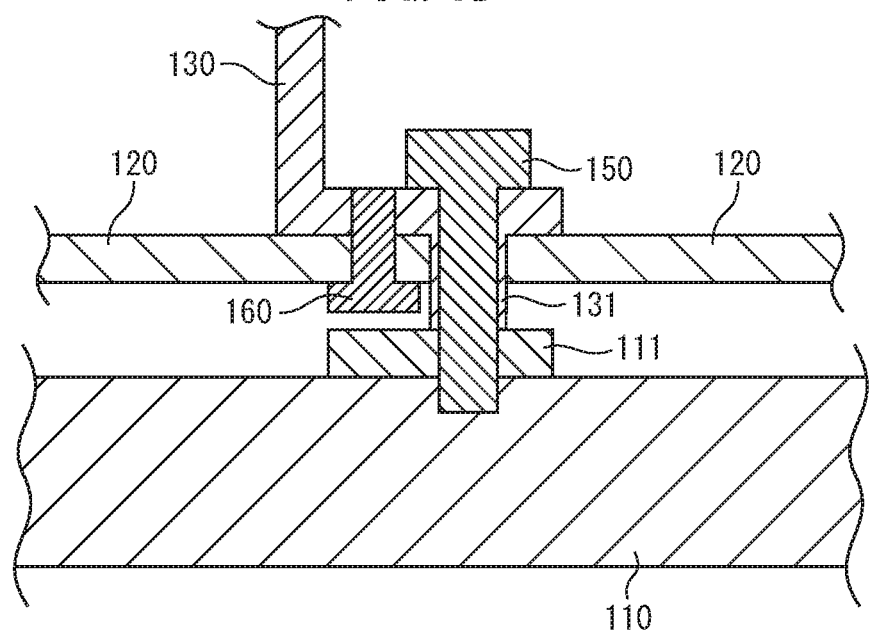
FIG. 6B is a sectional view illustrating a coupling structure according to conventional art, in which fastening by means of screw tightening is employed for both of coupling the bus bar to the power device and coupling the bus bar to the printed wiring board.

FIG. 6A is a perspective view illustrating a coupling structure according to conventional art, in which fastening by means of screw tightening is employed for both of coupling the bus bar to the power device and coupling the bus bar to the printed wiring board. FIG. 6B is a sectional view illustrating a coupling structure according to conventional art, in which fastening by means of screw tightening is employed for both of coupling the bus bar to the power device and coupling the bus bar to the printed wiring board. Note that, in FIG. 6A and FIG. 6B, illustration of electrical traces formed in the printed wiring board 120 electrically connected to the bus bar 130 is omitted.

As illustrated in FIG. 6A and FIG. 6B, in order to increase vibration resistance, a coupling structure has been traditionally employed, in which the bus bar 130 is electrically and physically fixed to the power device 110 and the printed wiring board 120 with placing the printed wiring board 120 between the bus bar 130 and the input/output terminal 111 of the power device 110 by fastening the bus bar 130 to the input/output terminal 111 of the power device 110 by means of screw tightening using the screw 150 and fastening the bus bar 130 to the printing wiring board 120 by means of screw tightening using a screw 160. In this coupling structure, two threaded holes are formed in the bus bar 130; as a result, a force is applied to the bus bar 130 during screw tightening and the strength of the bus bar 130 is reduced. In addition, processing a member having a narrow width like the bus bar 130 at two positions by means of the burring process or threaded hole formation is even more difficult, and leads to increase in the production cost of the motor drive apparatus.

In contrast, according to the embodiments of the present disclosure, the first connector portion 31 of the bus bar 30 is plate-like, and this plate-like portion comes into contact with the input/output terminal 11 of the power device 10; therefore, the electrically connected area is large and heat loss may be reduced, enabling high current to flow from the bus bar 30 into the power device 10 or out of the power device 10 to the bus bar 30. In addition, since the bus bar 30 has a stepped structure, and an error in fixing the bus bar 30 to the printed wiring board 20 and the power device 10 may be mitigated, production of the motor drive apparatus 1 is facilitated. The bus bar 30 itself may be easily produced because it is formed by processing a conductive metal plate into a stepped shape by a bending process. In addition, the stepped structure possesses elasticity, which improves strength (fracture resistance) and vibration resistance of the bus bar 30. Moreover, by appropriately adjusting the impedance of the conductive support block 40, it is therefore possible to cause low current having a desired magnitude divided from the current flowing through the bus bar 30 to flow into the electrical traces 21 of the printed wiring board 20.

Next, variations of the bus bar 30 and the conductive support block 40 will be described with reference to FIG. 7, FIG. 8A, and FIG. 8B. With respect to the bus bar 30 and the conductive support block 40, one or more ribs may be formed in order to further secure flexural strength.

Figure 7:
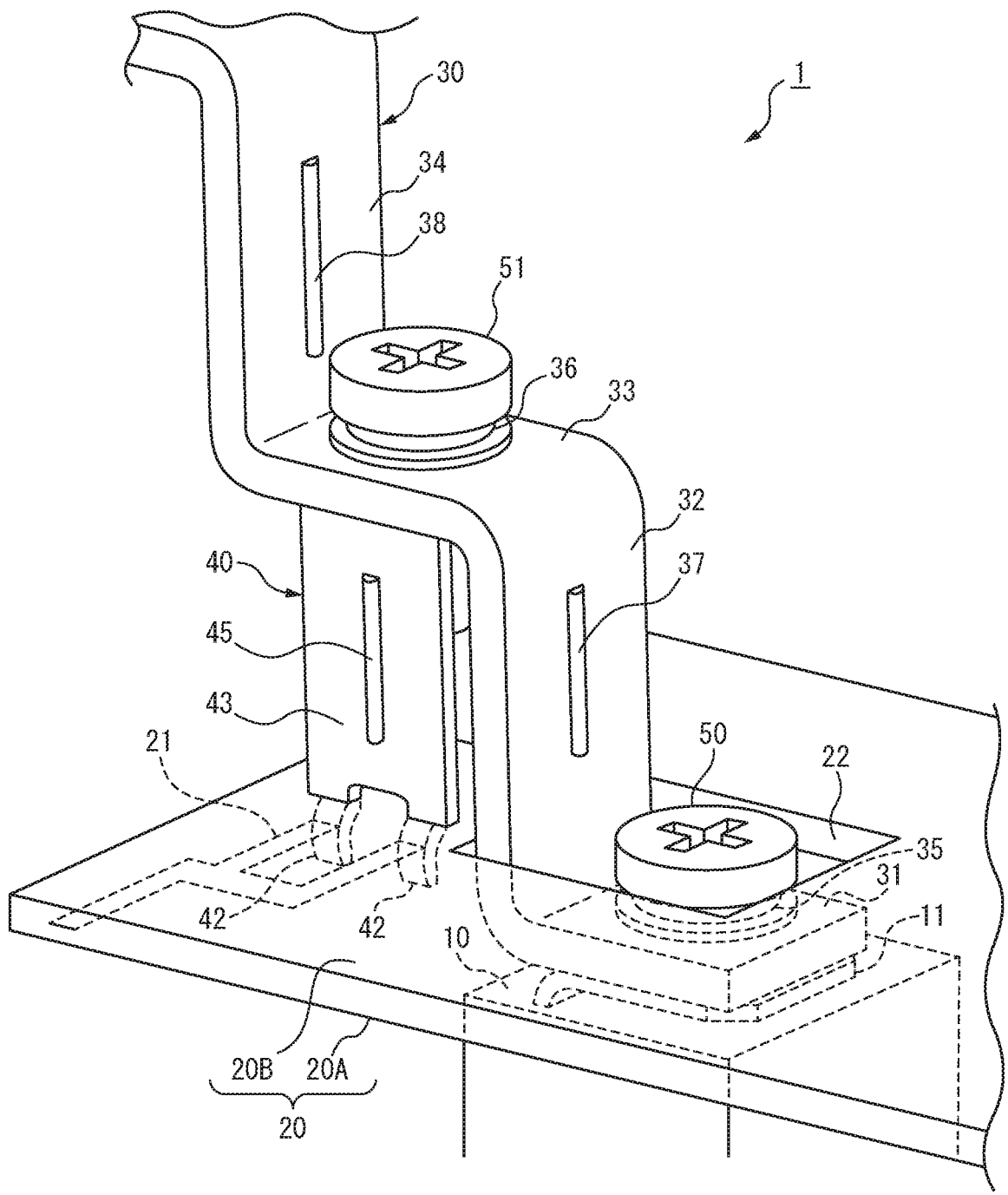
FIG. 7 is a perspective view illustrating a coupling structure in the motor drive apparatus according to one embodiment of the present disclosure, in which one or more ribs for securing flexural strength are formed in the bus bar and the conductive support block.
Figure 8A:
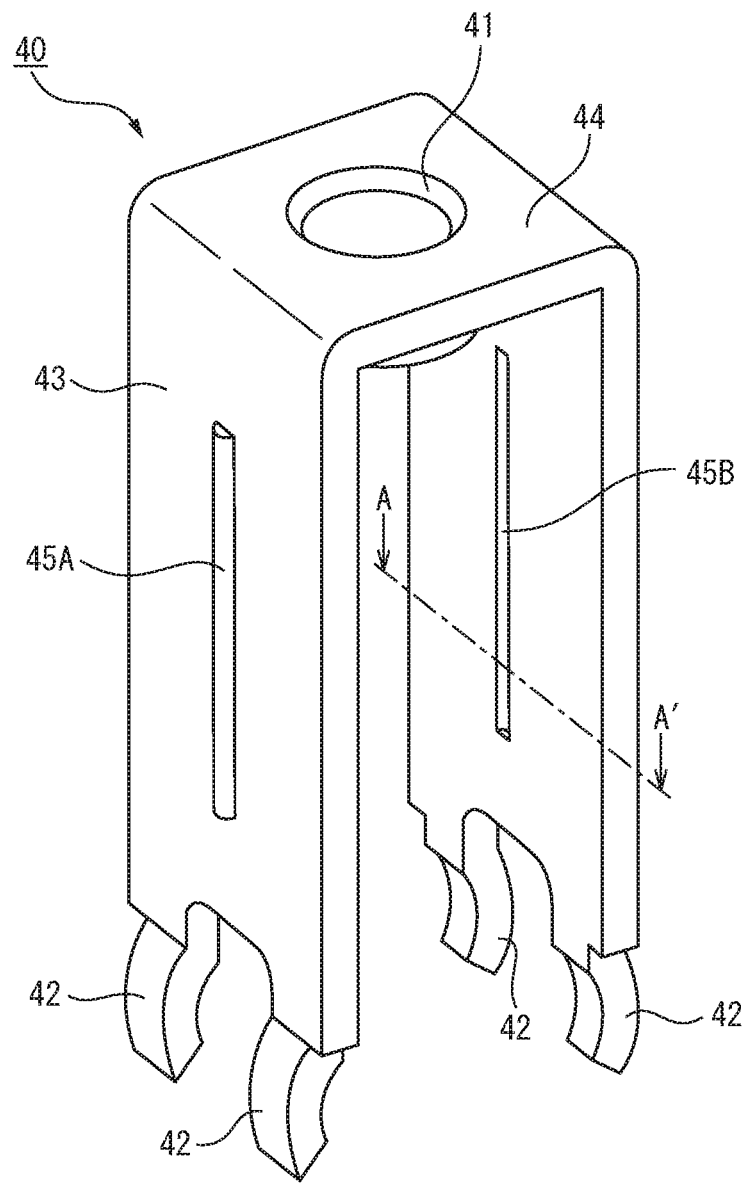
FIG. 8A is a perspective view illustrating the conductive support block in which ribs are formed in the motor drive apparatus according to one embodiment of the present disclosure.
Figure 8B:
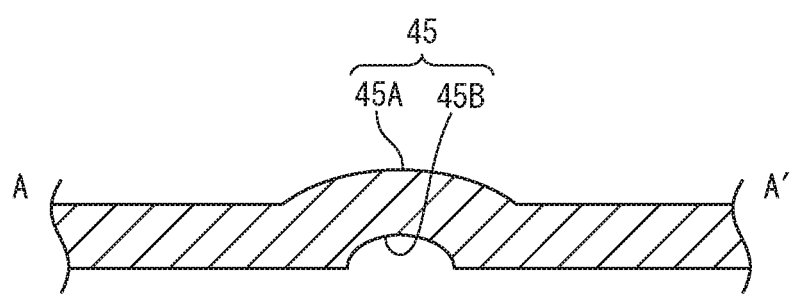
FIG. 8B is a sectional view illustrating the conductive support block in which ribs are formed taken along the line A-A' of FIG. 8A in the motor drive apparatus according to one embodiment of the present disclosure.

FIG. 7 is a perspective view illustrating a coupling structure in the motor drive apparatus according to one embodiment of the present disclosure, in which one or more ribs for securing flexural strength are formed in the bus bar and the conductive support block. FIG. 8A is a perspective view illustrating the conductive support block in which ribs are formed in the motor drive apparatus according to one embodiment of the present disclosure. FIG. 8B is a sectional view illustrating the conductive support block in which ribs are formed taken along the line A-A' of FIG. 8A in the motor drive apparatus according to one embodiment of the present disclosure. The ribs 37 and 38 formed in the bus bar 30 and the ribs 45 formed in the conductive support block 40 have a protruding portion and a recessed portion, which are formed by stamping on a plate-like metallic material. For example, as illustrated in FIG. 8A and FIG. 8B, in the conductive support block 40, the ribs 45 have a protruding portion 45A and a recessed portion 45B. The ribs 37, 38, and 45 may be formed at any position in the bus bar 30 and the conductive support block 40 at which flexural strength is desired to be secured. In the illustrated example, as an example, with respect to the bus bar 30, the rib 37 is formed in the extension portion 32 while the rib 38 is formed in the third connector portion 34. With respect to the conductive support block 40, the ribs 45 are formed in the side plates 43. Forming one or more ribs in the bus bar 30 and the conductive support block 40 in this manner improves strength (fracture resistance) and vibration resistance.

Next, a further example to which the motor drive apparatus 1 having the coupling structure as described above is applied will be described with reference to FIG. 9. Since the pair of side plates 43 included in the conductive support block 40 have a relatively big size, the side plates 43 of the conductive support block 40 mounted on the printed wiring board 20 may be used to serve as a splash-proof wall for other components mounted on the printed wiring board 20, or may be used to serve as a wall constituting a ventilation path for other components mounted on the printed wiring board 20.

Figure 9:
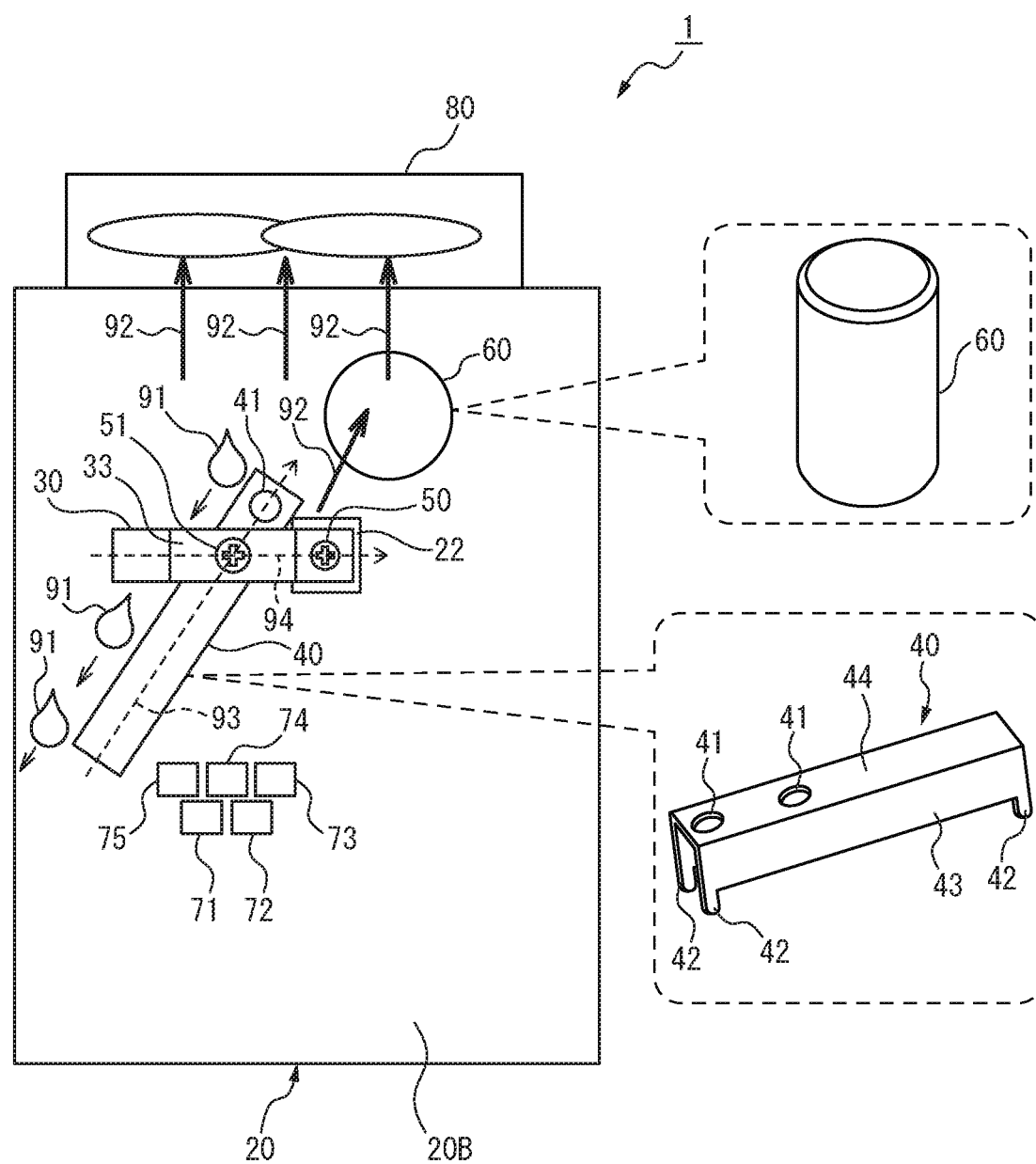
FIG. 9 is a front view illustrating the printed wiring board in the motor drive apparatus according to one embodiment of the present disclosure, in which the conductive support block serves as a splash-proof wall and a wall constituting a ventilation path.

FIG. 9 is a front view illustrating the printed wiring board in the motor drive apparatus according to one embodiment of the present disclosure, in which the conductive support block serves as a splash-proof wall and a wall constituting a ventilation path. As an example, a case where the printed wiring board 20 is placed upright in the motor drive apparatus 1 will be described. In the illustrated example, on the second surface 20B of the printed wiring board 20, the conductive support block 40 for supporting the bus bar 30, components 71 to 75 such as chip resistors, and an electrolytic capacitor 60 are mounted. Above the printed wiring board 20, a cooling fan 80 is also placed for cooling the components mounted on the printed wiring board 20. The conductive support block 40 is formed to have a size and a shape protruding laterally from the second connector portion 33 of the bus bar 30.

For example, when the motor drive apparatus 1 is used as a drive source for driving a motor in a machine tool, cutting fluid may drip from above the printed wiring board 20. When the components 71 to 75, to which cutting fluid 91 is desired not to adhere, are located below the conductive support block 40, the conductive support block 40 is mounted, as illustrated in FIG. 9, on the printed wiring board 20 in such a way that the source of cutting fluid outflow and the components 71 to 75 are disposed opposing against each other across the side plates 43 of the conductive support block 40. As a result, the cutting fluid dripping from above hits the side plate 43 of the conductive support block 40 and changes its flow direction to flow along the side plate 43; thus, the cutting fluid will not adhere to the components 71 to 75. In this manner, the side plates 43 of the conductive support block 40 may be used to serve as a splash-proof wall for other components mounted on the printed wiring board 20.

Components such as the electrolytic capacitor 60 that produce heat are cooled by an airflow generated by the cooling fan 80. In the illustrated example, the cooling fan 80 generates an airflow directed upward from below the printed wiring board 20 (in the direction of an arrow 92); when the conductive support block 40 is mounted on the printed wiring board 20 in such a way that the longitudinal direction of the side plates 43 of the conductive support block 40 is directed in the direction of an arrow 93, the air sucked up by the cooling fan 80 hits the electrolytic capacitor 60. As a result, the electrolytic capacitor 60 may be cooled. In this manner, the side plates 43 of the conductive support block 40 may be used to serve as a wall constituting a ventilation path for other components mounted on the printed wiring board 20.

Since the directions of the side plates of the conductive support block 40 may be relatively freely set as long as the conductive support block 40 can support the bus bar 30 at the second connector portion 33, the angle between a direction 93 along the side plate 43 of the conductive support block 40 and a direction 94 in which the bus bar extends may be appropriately designed in accordance with a positional relationship between the source of the cutting fluid outflow and the mounted components to which cutting fluid is desired not to adhere or a positional relationship between the cooling fan 80 and the mounted components which is desired to be cooled.

According to one aspect of the present disclosure, it is possible to achieve the motor drive apparatus having the structure for coupling the bus bar to the power device and the printed wiring board with low heat loss, high coupling strength, and high vibration resistance and at low cost.

The invention claimed is:

1. A motor drive apparatus, comprising:
a power device constituting a portion of a power conversion circuit for generating electric power for driving a motor and having input/output terminals;
a printed wiring board having a hole; and
a bus bar connected to both of the power device and the printed wiring board,
wherein the bus bar includes:
a first plate-like connector portion to be fixed to the input/output terminal;
a second connector portion to be connected to the printed wiring board; and
an extension portion extending between the first connector portion and the second connector portion that will pass through the hole.

2. The motor drive apparatus according to claim 1, wherein the extension portion extends in a direction that intersects with both of the first connector portion and the second connector portion.

3. The motor drive apparatus according to claim 2, the bus bar has a stepped structure formed by the first connector portion, the extension portion, and the second connector portion.

4. The motor drive apparatus according to claim 1, further comprising a conductive support block mounted on the printed wiring board and located between the second connector portion and the printed wiring board.

5. The motor drive apparatus according to claim 4,
wherein the conductive support block includes:
a hole for inserting a screw configured to fasten the second connector portion of the bus bar to the conductive support block by means of screw tightening; and terminals for the printed wiring board configured to electrically connect electrical traces formed in the printed wiring board to the conductive support block.

6. The motor drive apparatus according to claim 4, wherein the conductive support block includes:

a top plate to be fixed to the second connector portion; and a pair of side plates extending from a pair of edges of the top plate in a direction that intersects with the top plate and disposed at a distance from each other, wherein the pair of side plates are mounted on the printed wiring board at distal ends and support the second connector portion fixed to the top plate at a position separated from the printed wiring board.

7. The motor drive apparatus according to claim 4, wherein the conductive support block has a size and a shape protruding laterally from the second connector portion and constitutes a splash-proof wall for other components mounted on the printed wiring board.

8. The motor drive apparatus according to claim 4, wherein the conductive support block has a size and a shape protruding laterally from the second connector portion and constitutes a ventilation path for other components mounted on the printed wiring board.

9. The motor drive apparatus according to claim 4, wherein the conductive support block has one or more ribs configured to secure flexural strength of the conductive support block.

10. The motor drive apparatus according to claim 1, wherein the bus bar has ribs configured to secure flexural strength of the bus bar.

\* \* \* \* \*